United States Patent [19]

Roth

[11] 3,864,730

[45] Feb. 4, 1975

[54] TELEVISION RECEIVER INCLUDING A LARGE SCREEN PROJECTION SYSTEM

[76] Inventor: Solo S. Roth, One Sherwood Ter., Yonkers, N.Y. 10704

[22] Filed: Nov. 5, 1973

[21] Appl. No.: 412,694

[52] U.S. Cl. .................................... 358/63, 358/60

[51] Int. Cl. ............................................ H04n 9/14

[58] Field of Search .......... 313/464; 358/56, 59, 60, 358/61, 62, 63

[56] References Cited

UNITED STATES PATENTS

| | | | |
|---|---|---|---|
| 2,553,182 | 5/1951 | Cage | 358/60 |
| 3,383,460 | 5/1968 | Pritchard | 358/61 |
| 3,510,571 | 5/1970 | Biedermann | 358/63 |
| 3,652,956 | 3/1972 | Pinnow et al. | 358/60 |

*Primary Examiner*—Richard Murray

[57] ABSTRACT

A large screen television receiver using a laser beam to excite filaments or films of metal to incandescence. The discrete elements are focused onto a viewing screen which may be viewed by a large audience. The laser beam is split into three parts to show a three color image. Laser beam modulators, of any known type, are used to vary the beam intensity in accordance with the receiver signals. Synchronous moving mirrors are employed to scan the array of elements and a projector system is employed to project the received pattern onto a large screen.

9 Claims, 7 Drawing Figures

TELEVISION RECEIVER INCLUDING A LARGE SCREEN PROJECTION SYSTEM

REFERENCE TO RELATED PATENTS

The television receiver described herein is similar to the receiver described and claimed in U.S. Pat. No. 3,760,096, issued to S. S. Roth, Sept. 18, 1973.

BACKGROUND OF THE INVENTION

Laser beams have been the subject of considerable delopment work during the past few years because the beams contain a high density of luminous power. Several pilot models of picture receivers have been built but they have generally used the laser beam itself as the source of light for a picture. In order to show a three color image it is then necessary to provide three laser beams, one each for the red, blue, and green. There are other disadvantages to the direct laser beam display arrangement. There is a loss of luminous persistence which is liable to produce flicker and the high intencency beam is dangerous; anyone intercepting a beam is liable to be burned severely.

The present invention uses a single laser generator to provide all three colors for full color reproduction. A glass or quartz mounting plate of selected thermal storage capacity adds the required persistence and the laser beam is entirely enclosed within the apparatus so that there is no possibility of its reaching anyone in the audience.

One of the features of the invention is the use of metals having a high melting point, such as tungsten and platinum coupled with a filtering system, to provide a secondary source of light which can be used to illuminate a viewing screen.

Another feature of the invention is the safety factor. No excessive voltages are required. There is no danger of X-ray radiation and no large vacuum containers which might implode. The only energy produced external to the television receiver is a beam of focused light.

Other features and additional details of the invention will be disclosed in the following description, taken in connection with the accompanying drawings.

DESCRIPTION OF THE PREFERRED EMBODIMENTS

Figures 1, 2:
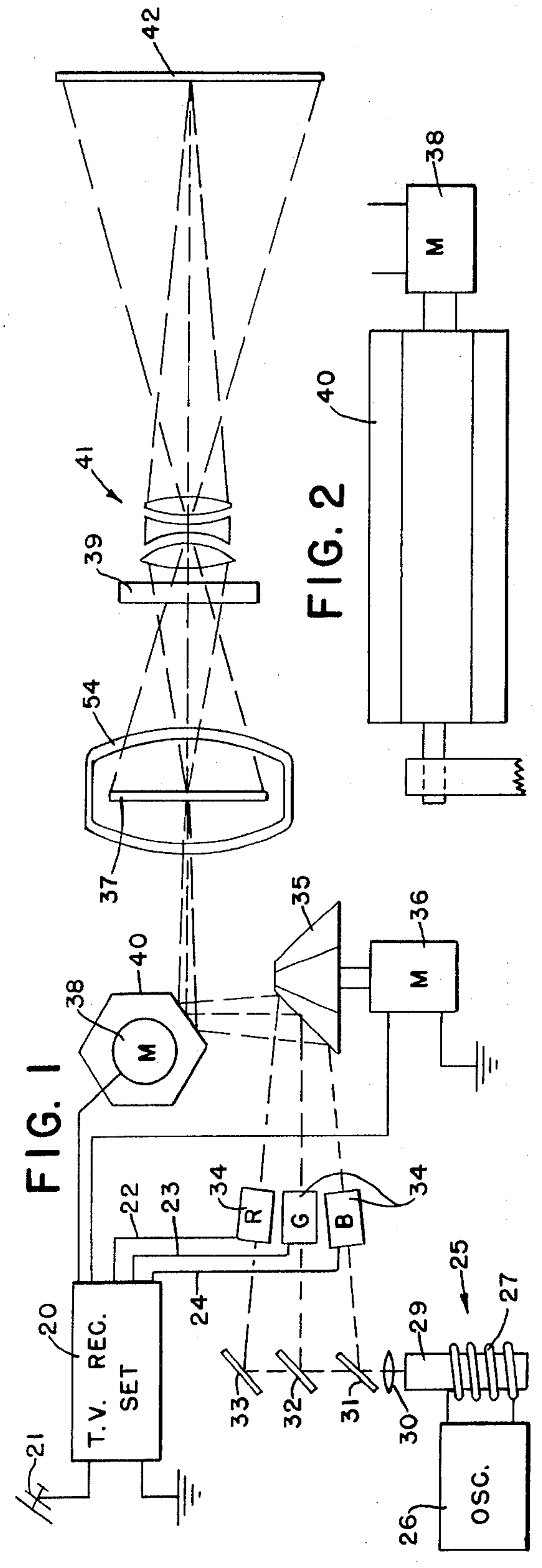
FIG. 1 is a schematic diagram of the entire receiving system with some components shown in block.
FIG. 2 is a front view of a rotating mirror for producing the vertical beam deflection.

Referring now to FIG. 1, the system includes a television receiving set 20, including an antenna 21, and three output conductors 22, 23, and 24, which carry the modulation information of the three primary colors, red, green, and blue. A laser light generator 25 includes an oscillator 26 for a pump tube 27 surrounding a crystal or gas tube 29. The light output from the laser is first focused by a lens 30 and then sent to a beam splitting mirror 31 which reflects one third of the light beam and transmits two-thirds of the light energy to the next mirror 32. The second mirror 31 reflects one half of the incident light and transmits one-half of the beam to a third mirror 33 which reflects all of the light it receives.

Mirrors 31, 32, and 33 send their reflected beams to modulators 34 which modulate the beams in accordance with the signals received from the set 20. Modulators 34 are identical to each other and may be of several known types. A preferred modulator operates in accordance with the Pockels effect, including a single crystal of quartz between two polarizing media. Conducting electrodes are placed on opposite sides of the crystal and the modulating voltage from set 20 is applied to the electrodes. Variations of modulating voltage alter the angle of the plane of polarization and varying amounts of light are passed through the cells 34. Other modulating means are known and can be used instead of the polarizing cells 34.

In order to scan the entire intermediate screen 37, two sets of rotating mirrors are employed. The first set 35 comprises a plurality of pyramidal reflecting faces, run by a synchronous motor 36. The motor 36 is driven by pulses received from the set 20 and move the laser beams horizontally across the screen 37. A second motor 38, also run by pulses from the television set 20, turns a cylindrical set of plane mirrors 40 to provide the vertical motion of the beams. Other scanning means may be used.

The intermediate screen 37 comprises an array of small areas, each including a metal which can be raised to incandescence by the heat energy of the laser beam. Som metals, such as platinum, tungsten, and tantalum, produce incandescence at lower temperatures than other metals and it is believed that photoluminescence plays a part in such an action. For the production of color, filters are added to the screen. The light generated by screen 37 is projected by a lens combination 41 and then focused to an image on a large viewing screen 42. A heat absorbing cell 39 may be used to absorb the infra red rays from screen 37.

Figures 3, 4:
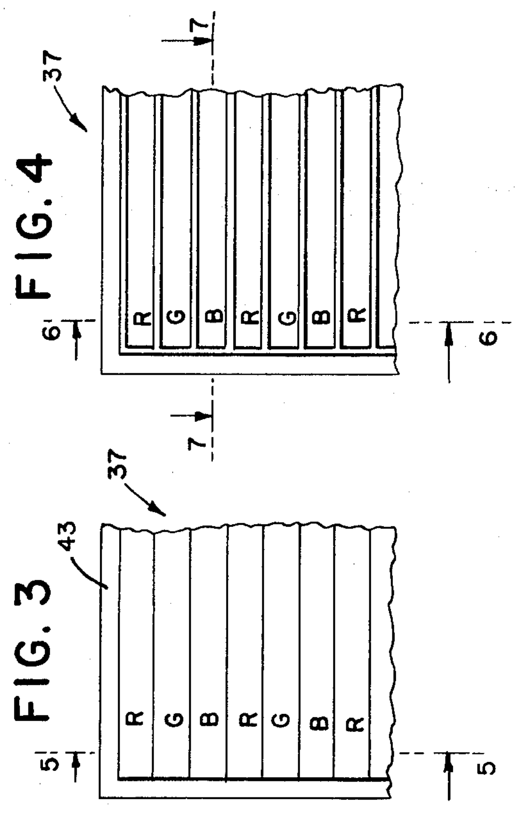
FIG. 3 is a partial plan view of the intermediate screen showing the arrangement of the color filters when a metal film is used.
FIG. 4 is a plan view similar to FIG. 3 but showing an alternate arrangement of elements using metal filaments.
Figures 5, 6, 7:
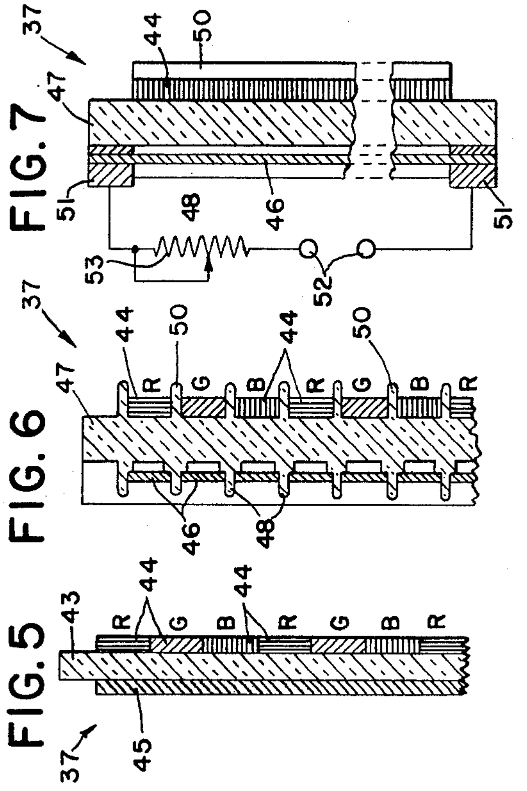
FIG. 5 is a cross sectional view of a portion of an intermediate screen, shown in FIG. 3, and is taken along line 5—5 of that figure. This view shows a single film of metal plus an array of color filters.
FIG. 6 is a cross sectional view of the screen shown in FIG. 4 and is taken along line 6—6 of that figure.
FIG. 7 is a cross sectional view of the screen shown in FIG. 4 and is taken along line 7—7 of that view.

The intermediate screen in its simplest form is shown in detail in FIGS. 3 and 5 where a plain backing sheet 43 of glass or quartz is coated first with a plurality of horizontal strips 44 of red, green, and blue color filter material. On one side of plate 43 a film 45 of tungsten, platinum, or tantalum is deposited. The laser beams are directed to scan the metal film in the well known line pattern, causing incandescence of the film in accordance with the amount of modulation furnished by the receiver circuit.

An alternate form of screen is shown in FIG. 6 where the metal is deposited in horizontal filaments 46 secured to one side of the glass support 47 and held in place by horizontal ribs 48. Ribs 48 separate the heat energy applied to each strip from its adjacent strips. On the opposite side of the glass plate 47 a similar array of glass ribs 50 is formed which separate and retain the strips of filter material 44. After the filter material is applied to the screen 47, a roller (not shown) supplied with black dye is rolled over the color filter side of the screen, depositing a film of dye on the edges of the ribs 50, thereby preventing light from the metal strips from leaking into the glass ribs and emerging at the rib edges to produce a series of white lines on the viewing screen 42. The black dye eliminates these lines and the focussed light on the screen shows only the light from the colored filters.

FIG. 7 shows another sectional view of the screen 37 shown in FIGS. 4 and 6 wherein the ends of the metal filaments 46 are clamped under copper electrodes 51. These electrodes are connected to terminals 52 in series with a variable resistor 53. Power, either A. C. or D. C., is applied to terminals 52 to send current through all the filaments and heat them to a temperature just under incandescence so that less heat energy from the laser beam is necessary to produce light.

The screen 37 is preferrably enclosed in a transparent envelope 54 which is either evacuated or partly filled with an inert gas such as argon to prevent oxidation of the metal (FIG. 1). The envelope also shields the filter material and metal filaments from dirt and corrosive gases. While the description of the incandescent material has been limited to metals such as tungsten, platinum, and tantalum, it is obvious that carbon filaments can be used.

The present standard method of scanning includes a picture pattern made up of horizontal lines equally spaced in vertical array. Such a pattern can be modulated to produce a picture either by modulating the light intensity or by varying the velocity of the scanning beam. Both modulating means can be used to operate the screen 37 to produce a colored picture responsive to television signals.

It is well known that certain metals produce colored light when heated to incandescence. Strontium, chromiun, cobalt, and sodium compounds may be used with the metal strips to produce colored images.

Having thus fully described the invention, what is claimed as new and desired to be secured by Letters Patent of the United States is:

1. A large screen television receiver comprising:

a. a laser for generating a concentrated beam of light;

b. Optical means for dividing the beam into three equal spaced beams;

c. modulation means positioned in the path of each beam for modulating the beam energies in accordance with a three color television signal;

d. horizontal and vertical scanning means for forming a three color pattern of a television signal in a first image plane;

e. an intermediate screen positioned in the first image plane, said screen including a transparent supporting sheet, a plurality of strips of a metal which is rendered incandescent when struck by a laser beam, and a plurality of color filters positioned adjacent to the strips for filtering the light produced by the metal strips;

f. optical means for focusing the light generated by the intermediate screen and projecting it to a second image plane; and g. a viewing screen positioned in the second image plane for showing the television signal.

2. A television receiver as claimed in claim 1 wherein said optical means for dividing the laser beam into three equal beams includes three mirrors, two of which include partially reflecting coatings.

3. A television receiver as claimed in claim 1 wherein said scanning means includes two rotating mirror arrangements.

4. A television receiver as claimed in claim 1 wherein said metal is taken from the group which consists of tungsten, platinum, and tantalum.

5. A television receiver as claimed in claim 1 wherein said intermediate screen is assembled with the metal strips positioned on one side of the transparent sheet and the filter sections positioned on the other side of the sheet.

6. A television receiver as claimed in claim 1 wherein said transparent sheet is formed with horizontal ribs to separate the filter strips.

7. A television receiver as claimed in claim 1 wherein said intermediate screen is housed within a gastight transparent envelope containing an inert gas.

8. A television receiver as claimed in claim 1 wherein said metal strips are heated to a temperature below incandescence by an electric current.

9. A television receiver as claimed in claim 1 wherein a heat absorbing material is placed in the optical means to remove infra red rays from the viewing screen.

* * * * *